United States Patent [19]

Gibson et al.

[11] Patent Number: 5,479,901
[45] Date of Patent: Jan. 2, 1996

[54] ELECTRO-HYDRAULIC SPOOL CONTROL VALVE ASSEMBLY ADAPTED FOR A FUEL INJECTOR

[75] Inventors: Dennis H. Gibson, Chillicothe; Gregory W. Hefler, Dunlap; Dale C. Maley, Fairbury; Ronald D. Shinogle, Peoria, all of Ill.

[73] Assignee: Caterpillar Inc., Peoria, Ill.

[21] Appl. No.: 266,735

[22] Filed: Jun. 27, 1994

[51] Int. Cl.$^6$ ............................. F02M 51/00; F16K 31/02
[52] U.S. Cl. ................. 123/472; 251/129.1; 137/625.65; 239/92; 239/585.2
[58] Field of Search .................................... 123/446, 467, 123/472; 251/129.1, 129.09; 137/625.65, 625.69; 239/88, 92, 95, 584, 585.1, 585.2, 586

[56] References Cited

U.S. PATENT DOCUMENTS

| | | | |
|---|---|---|---|
| 2,144,862 | 1/1939 | Truxell, Jr. | 299/107.2 |
| 2,421,329 | 5/1947 | Hoffer | 210/166 |
| 2,434,586 | 1/1948 | Reynolds | 31/58 |
| 2,512,557 | 6/1950 | Weldy | 299/107.6 |
| 2,535,937 | 12/1950 | Bozec et al. | 299/107.6 |
| 2,552,445 | 5/1951 | Nielsen | 299/131 |
| 2,597,952 | 5/1952 | Rosenlund | 137/139 |
| 2,621,011 | 12/1952 | Smith | 251/27 |
| 2,672,827 | 3/1954 | McGowen, Jr. | 103/232 |
| 2,727,498 | 12/1955 | Reiners | 123/32 |
| 2,749,181 | 6/1956 | Maxwell et al. | 299/107.6 |
| 2,916,048 | 12/1959 | Gunkel | 137/544 |
| 3,035,780 | 5/1962 | Peras | 299/453 |
| 3,057,560 | 10/1962 | Campbell | 239/464 |
| 3,071,714 | 1/1963 | Hadekel | 317/172 |
| 3,175,771 | 3/1965 | Brëting | 239/533 |
| 3,410,519 | 11/1968 | Evans | 251/141 |
| 3,532,121 | 10/1970 | Sturman et al. | 137/625.4 |
| 3,570,806 | 3/1971 | Sturman et al. | 251/65 |
| 3,570,807 | 3/1971 | Sturman et al. | 251/65 |
| 3,570,833 | 3/1971 | Sturman et al. | 267/161 |
| 3,585,547 | 6/1971 | Sturman | 335/227 |
| 3,604,959 | 9/1971 | Sturman et al. | 310/12 |

(List continued on next page.)

FOREIGN PATENT DOCUMENTS

| | | |
|---|---|---|
| 0425236A1 | 5/1991 | European Pat. Off. . |
| 0246373B1 | 3/1992 | European Pat. Off. . |
| 981664 | 12/1982 | U.S.S.R. . |

OTHER PUBLICATIONS

Sturman, "Breakthrough in Digital Valves," *Machine Design*, vol. 66, No. 4, dated Feb. 21, 1994, pp. 37–42.

Frankl, et al., "Electronic Unit Injectors–Revised," *SAE Technical Paper Series*, 40th Annual Earthmoving Industry Conference, Peoria, Ill., (Apr. 11–13, 1989).

Roters, "Electromagnetic Devices," First Edition, pp. 44–45, 67, 70.

*Primary Examiner*—Thomas N. Moulis
*Attorney, Agent, or Firm*—Martin J. Hirsch; Marshall O'Toole Gerstein Murray & Borun

[57] ABSTRACT

A fuel injector assembly for a fuel injection system has a fuel pumping assembly with a fuel inlet and a fuel nozzle for causing fuel to be periodically pumped from the fuel inlet through the nozzle. The fuel injector assembly has an electro-hydraulic control valve associated with the fuel pumping means. The control valve comprises a housing, a first conduit formed in the housing and fluidly coupled to the fuel pumping means, a second conduit formed in the housing and fluidly coupled to a source of pressurized hydraulic fluid. A valve element is disposed in the housing and is reciprocable between a first position in which the first conduit is fluidly coupled to the second conduit and a second position in which the first conduit is fluidly isolated from the second conduit. The control valve also includes a pair of electrically energizable electromagnetic devices for controlling the reciprocation of the valve element. The components of the control valve are preferably composed of SAE 52100 steel so that the valve element remains latched in the first and second positions after electric current to the electromagnetic devices is turned off.

15 Claims, 3 Drawing Sheets

U.S. PATENT DOCUMENTS

| | | | |
|---|---|---|---|
| 3,675,853 | 7/1972 | Lapera | 239/464 |
| 3,683,239 | 8/1972 | Sturman | 317/150 |
| 3,743,898 | 7/1973 | Sturman | 317/154 |
| 3,753,547 | 8/1973 | Topham | 251/120 |
| 3,814,376 | 6/1974 | Reinicke | 251/65 |
| 3,821,967 | 7/1974 | Sturman et al. | 137/624.15 |
| 3,835,829 | 9/1974 | Links | 123/139 E |
| 3,858,135 | 12/1974 | Gray | 335/266 |
| 3,989,066 | 11/1976 | Sturman et al. | 137/624.2 |
| 4,087,736 | 5/1978 | Mori et al. | 322/28 |
| 4,087,773 | 5/1978 | Jencks et al. | 335/243 |
| 4,107,546 | 8/1978 | Sturman et al. | 307/141 |
| 4,108,419 | 8/1978 | Sturman et al. | 251/30 |
| 4,114,647 | 9/1978 | Sturman et al. | 137/624.2 |
| 4,114,648 | 9/1978 | Nakajima et al. | 137/625.5 |
| 4,120,456 | 10/1978 | Kimura et al. | 239/464 |
| 4,152,676 | 5/1979 | Morgenthaler et al. | 333/24.1 |
| 4,189,816 | 2/1980 | Chalansonnet | 29/148.4 |
| 4,192,466 | 3/1980 | Tanasawa et al. | 239/464 |
| 4,231,525 | 11/1980 | Palma | 239/585 |
| 4,248,270 | 2/1981 | Ostrowski | 138/45 |
| 4,266,727 | 5/1981 | Happel et al. | 239/409 |
| 4,273,291 | 6/1981 | Müller | 239/533.12 |
| 4,275,693 | 6/1981 | Leckie | 123/447 |
| 4,308,891 | 1/1982 | Loup | 137/551 |
| 4,354,662 | 10/1982 | Thompson | 251/129 |
| 4,375,274 | 3/1983 | Thoma et al. | 239/574 |
| 4,392,612 | 7/1983 | Deckard et al. | 239/88 |
| 4,396,037 | 8/1983 | Wilcox | 137/625.65 |
| 4,409,638 | 10/1983 | Sturman et al. | 361/152 |
| 4,482,094 | 11/1984 | Knape | 239/88 |
| 4,501,290 | 2/1985 | Sturman et al. | 137/495 |
| 4,516,600 | 5/1985 | Sturman et al. | 137/495 |
| 4,518,147 | 5/1985 | Andresen et al. | 251/121 |
| 4,526,519 | 7/1985 | Mowbray et al. | 417/490 |
| 4,541,454 | 9/1985 | Sturman et al. | 137/505.41 |
| 4,558,844 | 12/1985 | Donohue, Jr. | 251/118 |
| 4,605,166 | 8/1986 | Kelly | 239/88 |
| 4,610,428 | 9/1986 | Fox | 251/129.16 |
| 4,628,881 | 12/1986 | Beck et al. | 123/446 |
| 4,653,455 | 3/1987 | Eblen et al. | 123/506 |
| 4,658,824 | 4/1987 | Scheibe | 123/472 |
| 4,702,212 | 10/1987 | Best et al. | 123/472 |
| 4,721,253 | 1/1988 | Noguchi et al. | 239/464 |
| 4,753,416 | 6/1988 | Inagaki et al. | 251/129.15 |
| 4,785,787 | 11/1988 | Riszk et al. | 123/506 |
| 4,787,412 | 11/1988 | Wigmore et al. | 137/625.65 |
| 4,794,890 | 1/1989 | Richeson, Jr. | 123/90.11 |
| 4,811,221 | 3/1989 | Sturman et al. | 364/420 |
| 4,812,884 | 3/1989 | Mohler | 335/258 |
| 4,813,599 | 3/1989 | Greiner et al. | 239/456 |
| 4,831,989 | 5/1989 | Haines | 123/506 |
| 4,846,440 | 7/1989 | Carlson et al. | 251/129.17 |
| 4,875,499 | 10/1989 | Fox | 137/82 |
| 4,893,102 | 1/1990 | Bauer | 335/132 |
| 4,893,652 | 1/1990 | Nogle et al. | 137/596.17 |
| 4,928,887 | 5/1990 | Miettaux | 239/584 |
| 4,955,334 | 9/1990 | Kawamura | 251/129.1 |
| 4,964,571 | 10/1990 | Taue et al. | 239/88 |
| 4,974,495 | 12/1990 | Richeson, Jr. | 137/625.65 |
| 4,979,674 | 12/1990 | Taira et al. | 239/88 |
| 4,993,637 | 2/1991 | Kanesaka | 239/96 |
| 5,004,577 | 4/1991 | Ward | 264/112 |
| 5,042,445 | 8/1991 | Peters et al. | 123/446 |
| 5,049,971 | 9/1991 | Krumm | 357/55 |
| 5,050,543 | 9/1991 | Kawamura | 123/90.11 |
| 5,108,070 | 4/1992 | Tominaga | 137/625.65 |
| 5,110,087 | 5/1992 | Studtmann et al. | 251/129.16 |
| 5,121,730 | 6/1992 | Ausman et al. | 123/467 |
| 5,131,624 | 7/1992 | Kreuter et al. | 251/129.18 |
| 5,143,291 | 9/1992 | Grinsteiner | 123/446 |
| 5,161,779 | 11/1992 | Graner et al. | 251/129.16 |
| 5,178,359 | 1/1993 | Stobbs et al. | 251/129.1 |
| 5,188,336 | 2/1993 | Graner et al. | 251/129.16 |
| 5,249,603 | 10/1993 | Byers, Jr. | 136/625.65 |
| 5,269,269 | 12/1993 | Kreuter | 251/129.1 |
| 5,287,829 | 2/1994 | Rose | 239/585.1 |
| 5,325,834 | 7/1994 | Ballheimer et al. | 123/446 |
| 5,339,777 | 8/1994 | Cannon | 137/625.65 |
| 5,346,673 | 9/1994 | Althausen et al. | 123/625.65 |

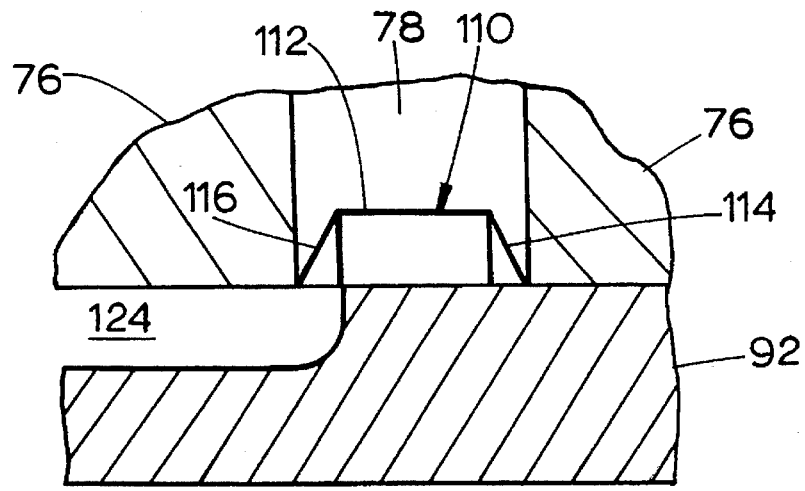
FIG. 3
FIG. 4
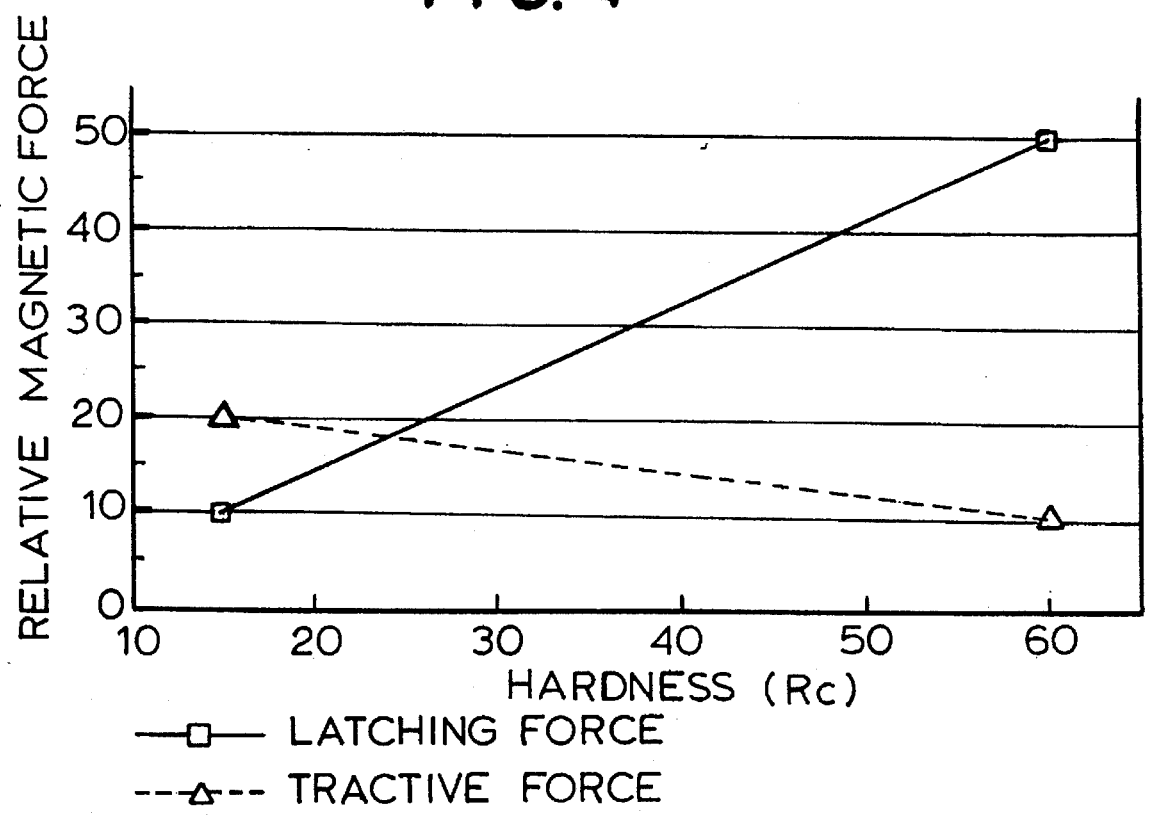

5,479,901

ELECTRO-HYDRAULIC SPOOL CONTROL VALVE ASSEMBLY ADAPTED FOR A FUEL INJECTOR

TECHNICAL FIELD

The present invention relates generally to fuel injection systems and, more particularly, to electro-hydraulic spool control valves adapted for fuel injectors.

BACKGROUND ART

In conventional fuel injection systems, the fuel injectors may be mechanically, hydraulically, or electrically actuated. In mechanically-actuated systems, the pumping assembly which periodically causes fuel to be injected into the engine cylinders is mechanically coupled or linked to a cam driven by the engine so that the pumping assembly is actuated in synchronism with the rotation of the cam. In hydraulically-actuated systems, the pumping assembly is hydraulically driven by pressurized actuating fluid which is selectively communicated to the pumping assembly by an electronically-controlled valve. One example of a hydraulically-actuated, electronically controlled fuel injection system is disclosed in U.S. Pat. No. 5,121,730 to Ausman, et al.

In conventional fuel injection systems which incorporate a poppet valve with one or more frusto-conical seats, the poppet valve may bounce after it initially hits its mating seat member in the process of closing. Since a tight seal will not be formed between the poppet valve and its seat until the bouncing stops, and since the bounce is typically not consistent for successive injections, the time at which fuel injection starts may vary undesirably injection to injection. Although this problem may be overcome with hydraulic damping systems or spring over-travel mechanisms, these solutions are relatively complicated and/or expensive.

Spool valve assemblies are typically formed of a generally cylindrical bore formed in a valve housing and a generally cylindrical valve element disposed for reciprocating movement within the cylindrical bore. The diameter of the each of the two ends of the cylindrical valve element is typically greater than that of the middle portion of the valve element. A plurality of fluid passages or bores are formed in the valve housing, and the reciprocation of the valve element selectively opens, closes, and/or interconnects the fluid passages. Examples of spool valves are disclosed in U.S. Pat. No. 5,042,445 to Peters, et al.

DISCLOSURE OF THE INVENTION

The invention is directed to a fuel injector assembly having a fuel pump and an electro-hydraulic control valve for periodically communicating actuating fluid to the fuel pump for hydraulic actuation thereof. When the fuel pump is actuated, the fuel injector assembly injects fuel, such as diesel fuel, into a combustion chamber of an engine.

The control valve includes a housing having a first conduit fluidly coupled to the fuel pump and a second conduit fluidly coupled to a source of pressurized hydraulic fluid. The control valve has a valve element, disposed in the housing, which has a first end, a second end, and a flow passageway disposed between the first and second ends.

In one aspect of the invention, the second conduit is fluidly coupled to a source of hydraulic fluid pressurized to a first pressure, and the first conduit is fluidly coupled to a pressure intensifier of the fuel pump. The valve element is movable between a first position in which the first conduit is fluidly coupled to the second conduit via the flow passageway so that the pressure intensifier causes fuel in the fuel pump to be pressurized to a second pressure greater than the first pressure and a second position in which the first conduit is fluidly isolated from the second conduit.

In another aspect of the invention, the control valve includes a third conduit for allowing hydraulic fluid to drain from the fuel pump, and the valve element is reciprocable between a first position in which the first conduit is fluidly coupled to the second conduit via the flow passageway to supply pressurized hydraulic fluid to the fuel pump and a second position in which the first conduit is fluidly coupled to the third conduit to allow hydraulic fluid to be drained from the fuel pump.

The position of the reciprocable valve element is controlled by a first electromagnetic device associated with a first end of the valve element and a second electromagnetic device associated with a second end of the valve element. Electrical energization of the first device causes the valve element to occupy one of the first and second positions and electrical energization of the second device causes the valve element to occupy the other of the first and second positions. Preferably the valve element is not biased by a spring or other similar means of forcing the valve element to move in any direction when no electrical power is provided to the electromagnetic devices.

The valve element and portions of the housing may be composed of materials having residual magnetic properties so that the valve element remains magnetically latched in the first and second positions via residual magnetism after the first and second devices, respectively, are deenergized.

The valve element may be provided with a substantially hollow interior portion to enable faster reciprocation of the valve element within the control valve. The substantially hollow valve element may, for example, be formed by an interior bore extending from one end of the valve element to the other.

The valve element may be provided with first and second ends having a diameter smaller than the diameter of the middle portion of the valve element. The distance which the valve element reciprocates may be made small so that the second conduit remains partially blocked by the valve element when it is in the first position and so that the third conduit remains partially blocked by the valve element when it is in the second position.

BRIEF DESCRIPTION OF THE DRAWINGS

FIG. 3 is an enlarged cross-sectional view of a portion of the control valve of FIG. 2; and FIG. 4 is a graph illustrating the relationship between the relative solenoid latching and tractive forces and hardness for SAE 52100 steel.

BEST MODE FOR CARRYING OUT THE INVENTION

Figure 1:
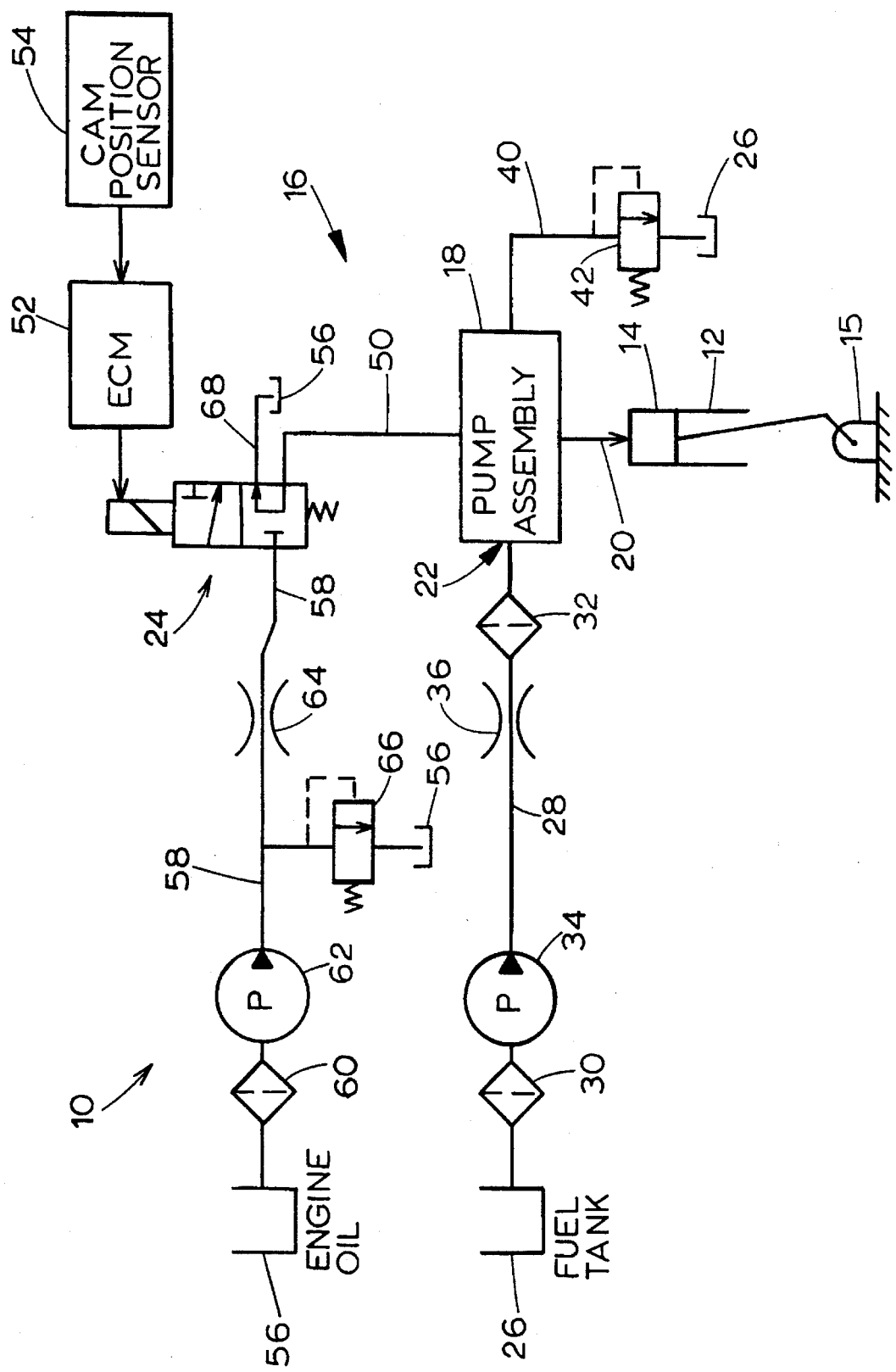
FIG. 1 is a schematic diagram of a hydraulically-actuated, electronically-controlled unit injector fuel system incorporating a fuel injector assembly in accordance with the present invention.

FIG. 1 illustrates a hydraulically-actuated, electronically-controlled unit injector (HEUI) fuel system 10. Although the HEUI fuel injection system 10 is adapted for a diesel-cycle, direct-injection internal combustion engine having a number of engine cylinders 12, only one of which is shown in FIG. 1 for purposes of simplicity, the fuel injection system 10 may be used with any type of diesel-cycle engine, ignition-assisted engine or any other type of engine where it is necessary or desirable to inject fuel into a combustion chamber.

A piston 14 driven by an engine crank 15 is disposed for reciprocation in each cylinder 12. Fuel is periodically injected into each engine cylinder 12 via a respective hydraulically-actuated, electronically-controlled unit injector 16. The unit injector 16 includes a high pressure fuel pump assembly 18, which periodically pumps fuel through a nozzle 20 into a combustion chamber partially defined by the cylinder 12, and an electro-hydraulic control valve assembly 24 which selectively communicates hydraulic actuating fluid to the pump assembly 18 for hydraulic actuation thereof. Fuel is provided to a fuel inlet 22 of the pump assembly 18 from a fuel tank 26 which is fluidly connected to the pump assembly 18 via a fuel passageway or line 28. The fuel line 28 preferably includes one or more filters 30, 32, a fuel transfer pump 34, and a flow restriction 36.

Figure 2:
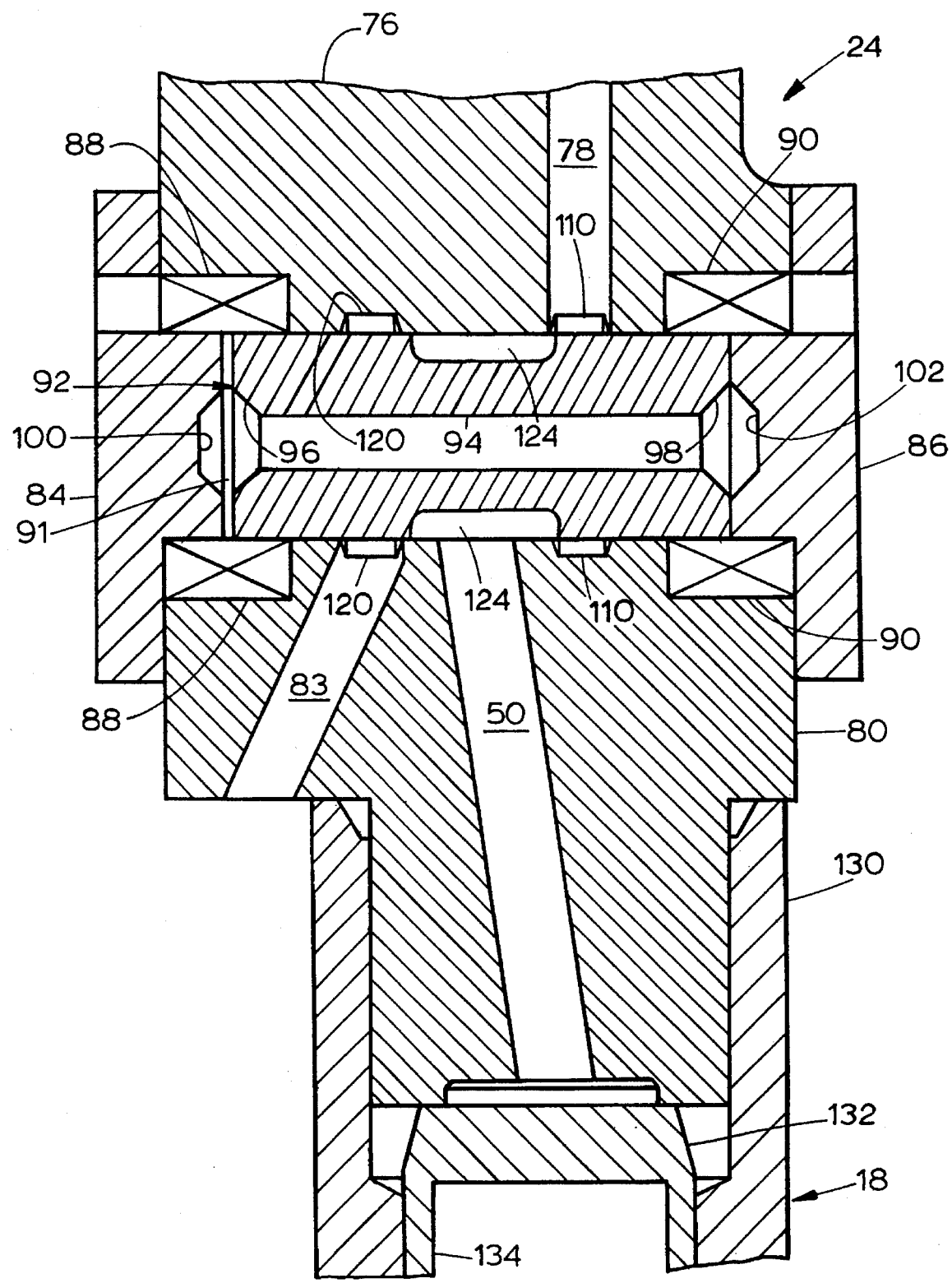
FIG. 2 is a cross-sectional view of an electro-hydraulic control valve in accordance with the present invention.

The pump assembly 18 includes a fuel pumping chamber, a check valve, and a relief valve (which are not shown) and a reciprocating piston 132 (shown in FIG. 2). The detailed structure of the pump assembly is not considered important to the invention, and any suitable structure may be utilized. One patent which discloses in detail an exemplary structure of a pump assembly for a HEUI fuel injection system is U.S. Pat. No. 5,121,730 to Ausman, et al., which is incorporated by reference herein.

During engine operation, the pump 34 continuously pumps fuel into the fuel chamber of the pump assembly 18 at a pressure of, for example, about 420 kPa (60 psi), and excess fuel exits the fuel chamber via a fuel passageway or line 40. The fuel line 40 is connected to a relief valve 42 which drains excess fuel back into the fuel tank 26. The relief valve 42 closes when the fuel pressure in the fuel line 40 falls below, for example, about 280 kPa (40 psi) and opens when the fuel pressure rises substantially above 40 psi in order to maintain sufficient fuel pressure in the fuel chamber of the pump assembly 18.

The reciprocating piston in the pump assembly 18 is periodically actuated by high-pressure hydraulic fluid periodically supplied to the pump assembly 18 via a hydraulic line 50. The fluid pressure of the hydraulic line 50 is modulated by the control valve assembly 24 in response to electronic controls signals provided to the control valve assembly 24 by an electronic control module (ECM) 52 coupled to one or more engine sensors which generate signals indicating operating conditions of the engine, which may include a cam position sensor 54.

Hydraulic fluid is supplied to the control valve assembly 24 from a source 56 of hydraulic fluid, such as lubricating oil from the engine crankcase, via a hydraulic line 58. A filter 60, a transfer pump 62, a fluid restriction 64, and a relief valve 66 are connected to the hydraulic line 58. The pump 62 supplies the hydraulic fluid to the control valve assembly 24 at a relatively high pressure. The relief valve 66 closes when the hydraulic fluid pressure falls below, for example, about 21,000 kPa (3,000 psi) and opens when the fluid pressure rises substantially above that pressure, thus maintaining the hydraulic fluid pressure supplied to the control valve assembly 24 at about 21,000 kPa (3,000 psi).

In the operation of the HEUI fuel injection system 10, fuel is continuously supplied to the fuel chamber within the pump assembly 18 via the fuel line 28. Periodically, the fuel present in the fuel chamber is forcibly injected into the combustion chamber defined by the cylinder 12 via the nozzle 20 by the reciprocating piston in the pump assembly 18. The reciprocation of the piston is controlled by the control valve assembly 24. When fuel is to be injected, the control valve assembly 24 supplies high-pressure hydraulic fluid to actuate the piston in the pump assembly 18 by fluidly interconnecting the hydraulic line 58 with the hydraulic line 50 connected to the pump assembly. After injection of the fuel, the control valve assembly 24 blocks the hydraulic line 58 and fluidly interconnects the hydraulic line 50 with a hydraulic line 68 to allow hydraulic fluid to drain from the pump assembly 18 back to the source 56 so that the piston in the pump assembly 18 returns to its non-actuated position.

A cross-section of the control valve assembly 24 and a portion of the pump assembly 18 are illustrated in FIG. 2. Referring to FIG. 2, the control valve assembly 24 preferably has an upper housing portion 76 in which a cylindrical conduit or bore 78 is formed, a lower housing portion 80 in which the hydraulic line 50 is provided as a cylindrical bore 50 and in which a conduit or bore 83 is formed, and a pair of side housing portions 84, 86. The cylindrical bore 78 is connected to and in fluid communication with the hydraulic line 58 and the cylindrical bore 83 is connected to and in fluid communication with the hydraulic line 68.

A pair of generally cylindrical electromagnetic devices, such as wire coils 88, 90, are schematically shown between the housing portions 76, 80, 84, 86. The interior surfaces of the housing portions 76, 80, 84, 86 and the wire coils 88, 90 form a cylindrical valve bore 91 in which a generally cylindrical valve element 92 is disposed for horizontal reciprocating movement. The valve element 92 is unbiased in the sense that there is no spring or other similar means of biasing or forcing the valve element 92 to move in any direction in the absence of electric current to the wire coils 88, 90. The fact that the valve element 92 is unbiased allows for a simple and compact structure.

A first annular recess 110 is formed in the housing portions 76, 80 about the circumference of the right-hand portion of the valve element 92. The central axis of the annular recess 110 is coincident with the central longitudinal axis of the valve element 92 so that the annular recess 110 is centered about the valve element 92. The annular recess 110 is aligned with the bottom end of the bore 78 so that it is in fluid communication with the bore 78 at all times.

FIG. 3 illustrates an enlarged portion of the control valve assembly 24 shown in FIG. 2 at the junction of the valve element 92 and the annular recess 110. As shown in FIG. 3, the annular recess 110 preferably has three portions, a first portion 112 of constant diameter, a first angled or tapered portion 114 adjacent the constant-diameter portion 112, and a second angled or tapered portion 116 adjacent the constant-diameter portion 112.

Referring back to FIG. 2, a second annular recess 120 is formed in the housing portions 76, 80 about the circumference of the left-hand portion of the valve element 92. The central axis of the annular recess 120 is coincident with the central longitudinal axis of the valve element 92 so that the recess 120 is centered about the valve element 92. The recess 120 is aligned with the top end of the bore 83 so that it is in fluid communication with the bore 83 at all times. The annular recess 120 also comprises a constant-diameter portion and two angled portions similar to the recess 110.

The diameter of the cylindrical valve bore 91 is slightly larger than the outer diameter of the left- and right-hand portions of the valve element 92 to allow it to reciprocate within the valve bore 91. The outer diameter of the central portion of the valve element 92 is smaller than the diameter of the valve bore 91 so as to form an annular space or flow passageway 124.

The valve element 92 has a central bore 94 formed therein along the central longitudinal axis of the valve element 92. A pair of counterbores 96, 98 with angled side walls are formed in the valve element 92 in coaxial alignment with the central bore 94. A pair of recesses 100, 102 having the same shape as the counterbores 96, 98 are formed in the interior walls of the housing portions 84, 86.

A portion of the pump assembly 18 is shown in the lower part of FIG. 2. The pump assembly 18 includes a generally cylindrical housing portion 130 in which a vertically reciprocating piston 132 having a hollow interior portion 134 is disposed. The upper surface of the piston 132 is positioned in FIG. 2 adjacent the bottom opening of the bore 50. The pump assembly 18 may be connected to the control valve assembly 24 in any conventional manner, such as by threading the lower housing portion 80 into the housing portion 130. The pressure intensifier 132 causes the pressure of the fuel within the fuel pump assembly 18, which may be up to about 210,000 kPa (30,000 psi), to be substantially higher than the hydraulic pressure within the bore 50 connected to the pressure intensifier 132, which may be about 21,000 kPa (3,000 psi) or less.

The valve element 92 has two actuated positions, a first position in which, as shown in FIG. 2, the right-hand end of the valve element 92 makes contact with the housing portion 86 so that there is a hydraulic fluid flow path from the bore 78, through the annular recess 110, through the annular space 124, and to the bore 50 to hydraulically actuate the piston 132 in the pump assembly 18. In the first position, the upper opening of the bore 83 is completely blocked by the valve element 92. In a second position in which the left-hand end of the valve element 92 makes contact with the housing portion 84, a hydraulic fluid flow path exists from the bore 50, through the annular space 124, through the annular recess 120, and to the bore 83 to allow hydraulic fluid to exit the pump assembly 18 after actuation of the piston 132. In the second position, the lower opening of the bore 78 is completely blocked by the valve element 92.

The housing portions 76, 80, 84, 86 and the valve element 92 are preferably formed of steel having a carbon content between about 0.8% and 1.2% and having a Rockwell C ("RC") hardness between about 40 and 60 so that the valve element 92 may be latched by residual magnetism in each of its actuated positions and so that the valve element 92 will not exhibit significant physical wear despite repeated actuation.

One example of a suitable steel is SAE (Society of Automotive Engineers) 52100 steel having an RC hardness of about 59. SAE 52100, which is a conventional steel used for bearing applications, has the following constituents, by weight percent, expressed either as a range of permissible percentages or a maximum allowable percentage:

| Carbon | 0.98–1.10% |
|---|---|
| Manganese | 0.25–0.45% |
| Phosphorous$_{max}$ | 0.025% |
| Sulfur$_{max}$ | 0.025% |
| Silicon | 0.15–0.30% |
| Chromium | 1.30–1.60% |

SAE 52100 steel may also have trace amounts of the following constituents:

| Copper$_{max}$ | 0.35% |
|---|---|
| Nickel$_{max}$ | 0.25% |
| Molybdenum$_{max}$ | 0.08% |

As described in more detail below, a suitable RC hardness may be achieved by heat treating the housing portions 76, 80, 84, 86 and the valve element 92.

One manner of energizing the wire coils 88, 90 to reciprocate the valve element 92 is described below. Other energization methods could be used, and the particular energization method is not considered important to the present invention.

In operation, to move the valve element 92 to the position shown in FIG. 2 (from a non-actuated position in which the valve element 92 is not latched) to fluidly interconnect the bores 78 and 50, only the wire coil 90 is electrically energized by passing electrical current through it in a direction to attract the valve element 92 towards the housing portion 86. During this portion of operation, the wire coil 88 is not electrically energized. When the valve element 92 makes contact with the housing portion 86, the electrical current in the wire coil 90 is shut off, and the valve element 92 will remain magnetically latched in contact with the housing portion 90 due to residual magnetism in the valve element 92 and the housing and the mutual magnetic attraction between those components.

To move the valve element 92 from its position shown in FIG. 2 to the position in which the valve element 92 abuts the housing portion 84 so as to fluidly interconnect the bores 50 and 83, the wire coil 88 is electrically energized by passing electrical current through it in a direction to attract the valve element 92 towards the housing portion 84. When the valve element 92 makes contact with the housing portion 84, the electrical current in the wire coil 88 is shut off, and the valve element 92 will remain magnetically latched in contact with the housing portion 84 due to residual magnetism. At approximately the same time that the wire coil 88 is energized, electrical current may optionally be generated in the wire coil 90 in the opposite direction (opposite the direction required to move the valve element 92 towards the housing portion 86) for a relatively brief period of time, such as less than one millisecond, to overcome the residual magnetism latching or holding the valve element 92 in contact with the housing portion 86.

It should be noted that the amount of horizontal travel of the valve element 92 during operation of the control valve 24 is very small to allow a relatively fast rate of reciprocation. In the preferred embodiment, the total horizontal travel of the valve element 92 is, for example, only about 0.13 millimeters (0.005 inches). In the two actuated positions of the valve element 92, the annular space 124 overlaps only a portion of the width of the annular recesses 110, 120. The fact that the valve element 92 is substantially hollow allows a relatively fast rate of reciprocation due to the decreased mass of the valve element 92. Also, the interior bore 94 in the valve element 92 reduces any buildup of hydraulic pressure between the two ends of the valve element 92 and the interior surfaces of the housing portions 84, 86 as the valve element 92 reciprocates, thus allowing a faster rate of reciprocation.

The dimensions of the valve element 92 may be advantageously selected so as to eliminate any inconsistent fuel injection resulting from bounce of the valve element 92 when it is moved to either of its two positions. This is accomplished by selecting the size of the annular space 124 so that when the valve element 92 is moved towards its right-hand position illustrated in FIG. 2, the annular space 124 will be in fluid communication with the annular recess 110, but not in fluid communication with the annular recess 120, regardless of the bounce of the valve element 92, and so that when the valve element 92 is moved towards its left-hand position opposite that illustrated in FIG. 2, the annular space 124 will be in fluid communication with the annular recess 120, but not in fluid communication with the annular recess 110, regardless of the bounce of the valve element 92.

The control assembly components formed of the preferred steel, which include the housing portions 76, 80, 84, 86 and the valve element 92 may be subject to a hardening process, such as heat treating, to achieve a desired, precise latching force. There is a relationship between the hardness of the preferred steel and the magnetic characteristics of the steel. As the hardness of the preferred steel increases, the magnetic characteristics change so that the amount of residual magnetism which can be induced in the steel increases. As a result, the latching force also increases.

FIG. 4 illustrates the general relationship between the RC hardness of SAE 52100 steel and the resultant latching and tractive forces, expressed as a relative percentage of magnetic force. It can be seen that the relative latching force (represented by the solid line) increases as the RC hardness of the steel increases. Although the relationship between RC hardness and latching force is generally illustrated in FIG. 4 to be linear, the graph in FIG. 4 is an approximation, and the relationship is not necessarily linear. The precise relationship between hardness and latching force for SAE 52100, as well as for other preferred steels, can be empirically determined by preparing a number of samples of a preferred steel having incrementally different hardnesses and measuring the resultant latching force for each steel sample. The measured latching force for each steel sample can be graphically plotted as in FIG. 4.

FIG. 4 also illustrates the general relationship between the tractive force (represented by the dotted line) and the RC hardness of the SAE 52100 steel. The tractive force is the attractive force exerted upon the valve element 92 due to electrical energization of one of the coils 88, 90. The precise relationship between the hardness and the relative tractive force can also be empirically determined for the preferred steels in a manner similar to that described above.

The steel components of the electro-hydraulic control valve assembly 24 may be manufactured in accordance with the following method. First, the desired latching force for the valve element 92 is determined in a conventional manner based upon typical factors such as the area of the valve element 92 that will be in contact with the housing portions 76, 80, 84, 86 and the number of amp-turns of the wire coils 88, 90 used in the control valve 24.

After the desired latching force is determined, that latching force is obtained by determining what the corresponding hardness of the control valve components should be, based on the known relationship between the hardness and the latching force, and heat treating the components to obtain that hardness.

For example, using the graph of the latching force illustrated in FIG. 4, if the desired latching force corresponds to a relative magnetic force of 45%, it can be seen that the corresponding RC hardness would be approximately 54. Therefore, to achieve the desired latching force, the control valve assembly components would be hardened by heat treatment or other suitable process to achieve a final RC hardness of 54.

In the method of manufacturing, the control valve assembly components are first formed out of steel using any conventional method, such as by machining them, and then they are subjected to a process, such as heat treatment, to achieve the desired hardness, and as a result, to achieve the desired latching force.

In the heat treating process, the components are initially hardened by raising their temperatures to a first relatively high temperature, such as 843° C. (1,550° F.), and then by cooling them in an agitated bath, such as an oil bath. As a result of this hardening step, the initial hardness of the steel components will be a relatively high value, such as an RC hardness of 65.

After the hardening step, the components are subject to a tempering step. In this step, the temperature of the components is raised to a second temperature, such as 200° C. (400° F.), lower than the first relatively high temperature employed in the initial hardening step. As is well known, the temperature to which the components are raised in the tempering step depends on the final hardness to be achieved. The components are then cooled, such as by air cooling them. As a result of the tempering step, the hardness of the components will be reduced to a lower value, such as an RC hardness of 59. The use of the two temperatures listed above (200° C. and 843° C.) will produce components with an RC hardness of 59.

In the heat treating steps described above (and as is conventional practice), a relatively large number of components are simultaneously heated and cooled together to maximize the energy efficiency of the process.

INDUSTRIAL APPLICABILITY

The electro-hydraulic control valve assembly described above has numerous applications in industry, such as in fuel injection systems. Such fuel injection systems could include, for example, hydraulically- actuated, electronically-controlled injector fuel systems or mechanically actuated, electronically controlled injector fuel systems.

The control valve assembly could be used to control various types of fuel injectors, including fuel injectors which incorporate check valves, such as fuel injectors of the type disclosed in U.S. Pat. No. 5,121,730 to Ausman, et al.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A hydraulically-actuated fuel injector assembly comprising:

fuel pumping means, having a fuel inlet and a nozzle, for causing fuel to be periodically pumped from said fuel inlet through said nozzle; and an electro-hydraulic control valve assembly associated with said fuel pumping means, said control valve assembly comprising:

a housing;

a first conduit formed in said housing, said first conduit being fluidly coupled to said fuel pumping means;

a second conduit formed in said housing, said second conduit being fluidly coupled to a source of pressurized hydraulic fluid;

a third conduit formed in said housing;

an unbiased valve element disposed in said housing, said valve element having a first end, a second end, and a flow passageway disposed between said first and second ends, said valve element being movable between a first position in which said first conduit is fluidly coupled to said second conduit via said flow passageway to supply pressurized hydraulic fluid to said fuel pumping means and in which said first conduit is fluidly isolated from said third conduit and a second position in which said first conduit is fluidly coupled to said third conduit to allow hydraulic fluid to be drained from said fuel pumping means and in which said first conduit is fluidly isolated from said second conduit;

a first electromagnetic device associated with said first end of said valve element, said first device causing said valve element to occupy one of said first and second positions when said first device is electrically energized; and a second electromagnetic device associated with said second end of said valve element, said second device causing said valve element to occupy the other of said first and second positions when said second device is electrically energized.

2. A fuel injector assembly as defined in claim 1 wherein said valve element has a substantially hollow interior portion.

3. A fuel injector assembly as defined in claim 1 wherein said valve element has an internal bore extending from said first end of said valve element to said second end of said valve element.

4. A fuel injector assembly as defined in claim 1 wherein said first end of said valve element has a first diameter, said second end of said valve element has a second diameter substantially the same as said first diameter, and wherein said valve element has a middle portion having a third diameter less than said first diameter and said second diameter.

5. A fuel injector assembly as defined in claim 1 wherein said second conduit has an opening that is partially blocked by said valve element when said valve element is in said first position and wherein said third conduit has an opening that is partially blocked by said valve element when said valve element is in said second position.

6. A fuel injector assembly as defined in claim 1 wherein said valve element remains latched in said first position via residual magnetism after said first device is deenergized and wherein said valve element remains Latched in said second position via residual magnetism after said second device is deenergized.

7. A fuel injector assembly as defined in claim 1 wherein said fuel pumping means comprises:

a pump housing; and a reciprocable piston provided in said pump housing, said piston having a substantially hollow interior portion.

8. A fuel injector assembly comprising:

fuel pumping means, having a fuel inlet and a nozzle, for causing fuel to be periodically pumped from said fuel inlet through said nozzle; and a control valve associated with said fuel pumping means, said control valve comprising:

a housing;

a first conduit formed in said housing, said first conduit being fluidly coupled to said fuel pumping means;

a second conduit formed in said housing, said second conduit being fluidly coupled to a source of pressurized hydraulic fluid;

a third conduit formed in said housing;

a valve element disposed in said housing, said valve element having a first end, a second end, and a flow passageway disposed between said first and second ends, said valve element being movable between a first position in which said first conduit is fluidly coupled to said second conduit via said flow passageway to supply pressurized hydraulic fluid to said fuel pumping means and in which said first conduit is fluidly isolated from said third conduit and a second position in which said first conduit is fluidly coupled to said third conduit to allow hydraulic fluid to be drained from said fuel pumping means and in which said first conduit is fluidly isolated from said second conduit;

a first electromagnetic device associated with said first end of said valve element, said first device causing said valve element to occupy one of said first and second positions when said first device is energized; and a second electromagnetic device associated with said second end of said valve element, said second device causing said valve element to occupy the other of said first and second positions when said second device is energized.

9. A fuel injector assembly as defined in claim 8 wherein said valve element has a substantially hollow interior portion.

10. A fuel injector assembly as defined in claim 8 wherein said valve element has an internal bore extending from said first end of said valve element to said second end of said valve element.

11. A fuel injector assembly as defined in claim 8 wherein said first end of said valve element has a first diameter, said second end of said valve element has a second diameter substantially the same as said first diameter, and wherein said valve element has a middle portion having a third diameter less than said first diameter and said second diameter.

12. A fuel injector assembly as defined in claim 8 wherein said second conduit has an opening that is partially blocked by said valve element when said valve element is in said first position and wherein said third conduit has an opening that is partially blocked by said valve element when said valve element is in said second position.

13. A fuel injector assembly as defined in claim 8 wherein said valve element remains latched in said first position via residual magnetism after said first device is deenergized and wherein said valve element remains latched in said second position via residual magnetism after said second device is deenergized.

14. A fuel injector assembly as defined in claim 8 wherein said fuel pumping means comprises:

a pump housing; and a reciprocable piston provided in said pump housing, said piston having a substantially hollow interior portion.

15. An electro-hydraulic control valve assembly adapted for a fuel injector, said control valve assembly comprising:

a housing;

a first conduit formed in said housing, said first conduit being adapted to be fluidly coupled to a fuel pumping means;

a second conduit formed in said housing, said second conduit being adapted to be fluidly coupled to a source of pressurized hydraulic fluid;

a third conduit formed in said housing;

an unbiased valve element disposed in said housing, said valve element having a first end, a second end, and a flow passageway disposed between said first and second ends, said valve element being movable between a first position in which said first conduit is fluidly coupled to said second conduit via said flow passageway and adapted to supply pressurized hydraulic fluid to said fuel pumping means and in which said first conduit is fluidly isolated from said third conduit and a second position in which said first conduit is fluidly coupled to said third conduit and adapted to allow hydraulic fluid to be drained from said fuel pumping means and in which said first fluid conduit is fluidly isolated from said second conduit;

a first electromagnetic device associated with said first end of said valve element, said first device causing said valve element to occupy one of said first and second positions when said first device is electrically energized; and a second electromagnetic device associated with said second end of said valve element, said second device causing said valve element to occupy the other of said first and second positions when said second device is electrically energized.

* * * * *

UNITED STATES PATENT AND TRADEMARK OFFICE
CERTIFICATE OF CORRECTION

PATENT NO. : 5,479,901
DATED : January 2, 1996
INVENTOR(S) : Dennis H. Gibson et al.

It is certified that error appears in the above-identified patent and that said Letters Patent is hereby corrected as shown below:

Title page,
Item [75], Inventors, "Dennis H. Gibson, Gregory W. Hefler, Dale C. Maley, Ronald D. Shinogle" should read -- Oded E. Sturman --.

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 5,479,901
DATED : January 2, 1996
INVENTOR(S) : Dennis H. Gibson et al.

It is certified that error appears in the above-identified patent and that said Letters Patent is hereby corrected as shown below:

<u>Title page</u>,
Item [75], Inventors, "Oded E. Sturman" should read -- Dennis H. Gibson, Gregory W. Hefler, Dale C. Maley, Ronald D. Shinogle --

Signed and Sealed this

Seventh Day of June, 2005

JON W. DUDAS
*Director of the United States Patent and Trademark Office*